United States Patent [19]

Lee

[11] 4,065,774

[45] Dec. 27, 1977

[54] HYBRID FLUID JET DROP GENERATION

[75] Inventor: Chen-Hsiung Lee, San Jose, Calif.

[73] Assignee: International Business Machines Corporation, Armonk, N.Y.

[21] Appl. No.: 582,487

[22] Filed: May 30, 1975

[51] Int. Cl.$^2$ .............................................. G01D 15/18

[52] U.S. Cl. ................................................. 346/140 R

[58] Field of Search .............................. 346/75, 1, 140

[56] References Cited

U.S. PATENT DOCUMENTS

| | | | |
|---|---|---|---|
| 3,334,351 | 8/1967 | Stauffer | 346/75 |
| 3,376,347 | 3/1968 | Sweet et al. | 346/75 |
| 3,577,198 | 5/1971 | Beam | 346/75 |
| 3,739,393 | 6/1973 | Lyon et al. | 346/1;75 X |
| 3,823,408 | 7/1974 | Gordon | 346/75 X |
| 3,836,913 | 9/1974 | Burnett et al. | 346/75 |
| 3,895,386 | 7/1975 | Keur et al. | 346/75 X |
| 3,900,162 | 8/1975 | Titus et al. | 346/75 X |

OTHER PUBLICATIONS

Lee et al., High-Speed Droplet Generator, IBM Tech. Disc. Bulletin, vol. 15, No. 3, Aug. 1972, p. 909.

Fowler, Ink Jet Copier Nozzle Array, IBM Tech. Disc. Bulletin, vol. 16, No. 4, Sept. 1973, pp. 1251-1253.

Meier, Mechanical X-Y Aiming of Ink Jet Printer Nozzles, IBM Tech. Disc. Bulletin, vol. 15, No. 5, Oct. 1972, p. 1683.

*Primary Examiner*—George H. Miller, Jr.

*Attorney, Agent, or Firm*—John H. Holcombe; Otto Schmid, Jr.

[57] ABSTRACT

A pressurized fluid issuing from a nozzle orifice to form a jet stream is perturbated by a hybrid velocity and pressure modulation to form a stream of drops. A perturbation means, such as a piezoelectric crystal, is mounted both to vibrate the nozzle for modulating the stream velocity and to perturbate the interior volume of a fluid cavity communicating with the nozzle for also modulating the pressure of the fluid.

6 Claims, 6 Drawing Figures

HYBRID FLUID JET DROP GENERATION

BACKGROUND OF THE INVENTION

Generation of a stream of uniform drops has always been an important facet of ink jet printing systems. Uniformly sized drops may be charged and deflected uniformly and will form uniformly sized spots upon impacting a recording medium. Ink jet printing may be accomplished by one or a plurality of ink jet nozzles. An example of a multi-nozzle ink jet system is described in Sweet et al, U.S. Pat. No. 3,373,437, "Fluid Droplet Recorder with a Plurality of Jets." In that system, the jet nozzle orifices are arranged along a straight line and a recording medium is moved in a direction normal to that line while binary coded video signals are applied to selectively remove drops from the print streams. Two separate and alternative means of generating the drops are described. One means employs a magnetostrictive driver to vibrate the entire manifold including the nozzle orifices. This results in a velocity modulation of the streams. Another means includes a flexible wall for the manifold attached to the driver while the manifold is fixed in position to modulate the pressure of the fluid.

The ink is ejected from the nozzle orifices as continuous streams, the perturbations causing the streams to form varicosities which grow in amplitude until the continuous streams each break up into serial streams of uniformly sized drops.

The major problem with pressure modulation for a multinozzle ink jet with a common manifold is that the manifold cavity in which the pressure modulation occurs must not be too small such that the flow pattern behind the nozzles would differ from one to the other. Hence, when a larger manifold is used, the volume to be displaced to obtain proper pressure modulation is also increased substantially. Pressure modulation thus becomes less efficient.

On the other hand, velocity modulation requires no more displacement for multiple nozzles than for a single nozzle. However, the mass to be vibrated increases, reducing the efficiency. Further, when a flat nozzle plate is used, various resonances can result. It thus becomes difficult to maintain the plane of perturbation in a single row of nozzles in the same phase and in the same plane along the entire row. This may result in drop breakoff occurring at different times at different distances from the recording medium for the various streams in the row. Thus, where the recording medium is moving normal to the row of nozzles, as in Sweet et al, above, not all the drops would impact the recording medium at the same time to generate a straight line. Rather, a wavy or sloped line might result. Therefore, the structure must be designed with sufficient strength and mass to avoid adverse resonances, thereby further reducing the efficiency of the drop generator.

Stauffer, U.S. Pat. No. 3,334,351, "Ink Droplet Recorder with Plural Nozzle-Vibrators" describes the use of two separate transducers at different angles to impart dual motions to a single nozzle. The dual arrangement is manifestly inefficient. Further, when applied to a multinozzle head, the arrangement would result in a complex motion, making attainment of drop breakoff for all streams at the same distance from the recording medium extremely difficult.

Lyon et al, U.S. Pat. No. 3,739,393, "Apparatus and Method for Generation of Drops Using Bending Waves" describes vibration of one end of a nozzle plate to transmit bending waves to the other end of the plate which is damped, causing a velocity modulation of the jets. The structural design must therefore be carefully done and then manufactured under tight tolerances to operate at the desired frequency. Further, the modulation results in a phase delay between nozzles such that drops do not break off simultaneously.

SUMMARY OF THE INVENTION

It is therefore an object of the present invention to provide an ink jet perturbation means which operates with high efficiency and employs only a single transducer.

In accordance with the present invention, there is provided for use in a fluid jet head including a source of pressurized fluid, at least one nozzle orifice, and a manifold communicating with the source and the orifice, a perturbation means arranged to vary both the volume of the manifold and the location of the orifice in an axial direction for thereby perturbating the pressure of the fluid and the velocity of a fluid stream emanating from the orifice.

An advantage of the invention is that it allows use of a thick crystal and makes the perturbation insensitive to small variations in mounting, resulting in greater allowable tolerances and reduces cost.

The foregoing and other objects, features and advantages of the invention will be apparent from the following more particular description of a preferred embodiment of the invention as illustrated in the accompanying drawings.

BRIEF DESCRIPTION OF THE DRAWINGS

Referring to FIG. 1, a fluid jet head assembly is shown for the generation of fluid streams which break into streams of uniform drops. Should the fluid comprise an electrostatic writing fluid, the drops may selectively be given an electrostatic charge upon breakoff and the charged drops subsequently deflected to a gutter while the uncharged drops continue towards the recording medium for selective impingement thereon in accordance with the system described in the Sweet et al patent, above. Specific charging, deflection and guttering means are described in copending patent application Ser. No. 543,851, Chocholaty, filed Jan. 24, 1975, entitled "High Voltage Deflection Electrode Apparatus for Ink Jet," assigned in common with the present application. Alternatively, the fluid may comprise a magnetic writing fluid wherein the droplets may be selectively deflected by magnetic fields.

As is well known, fluid streams emanating from nozzle orifices tend to become unstable and break into various sized droplets. Practical uses of droplets for purposes such as printing requires that the fluid streams break into streams of uniformly sized drops. Therefore, considerable prior effort has been directed towards perturbation of fluids or of fluid streams in a repetitively uniform manner to cause the streams to break into streams of uniform drops.

Figure 1:
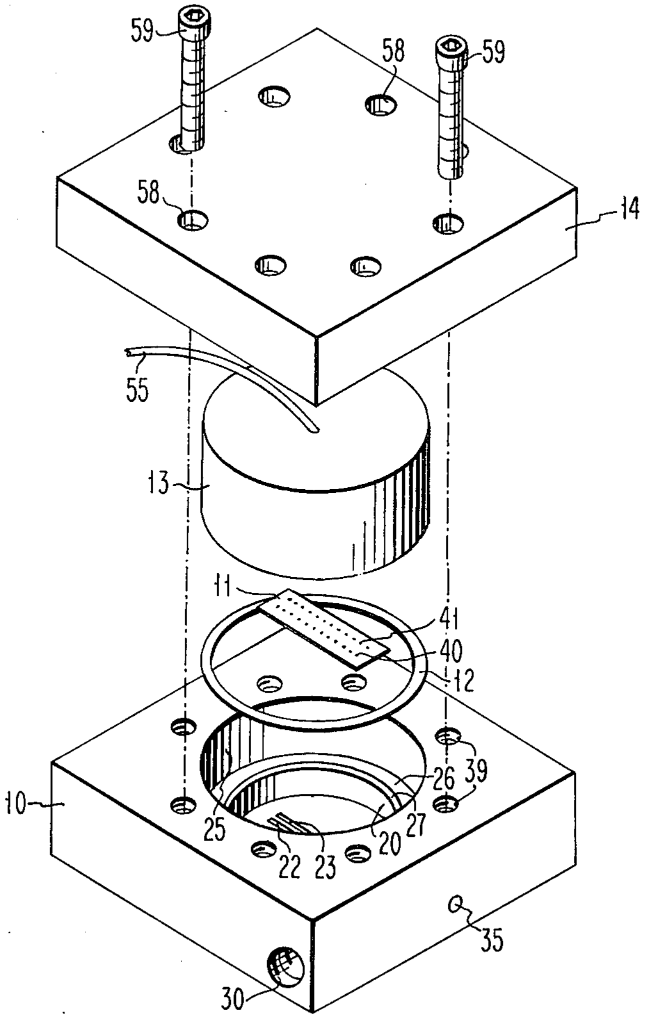
FIG. 1 is an exploded perspective view of a fluid jet head constructed in accordance with the invention.

The apparatus of FIG. 1 accomplishes a dual mode or hybrid velocity and pressure modulation of the fluid and fluid streams to form streams of uniformly sized drops. The fluid jet head of FIG. 1 includes a cavity plate 10, a nozzle plate 11, an O-ring 12, a piezoelectric crystal driver 13, and a mounting block 14.

Figure 2:
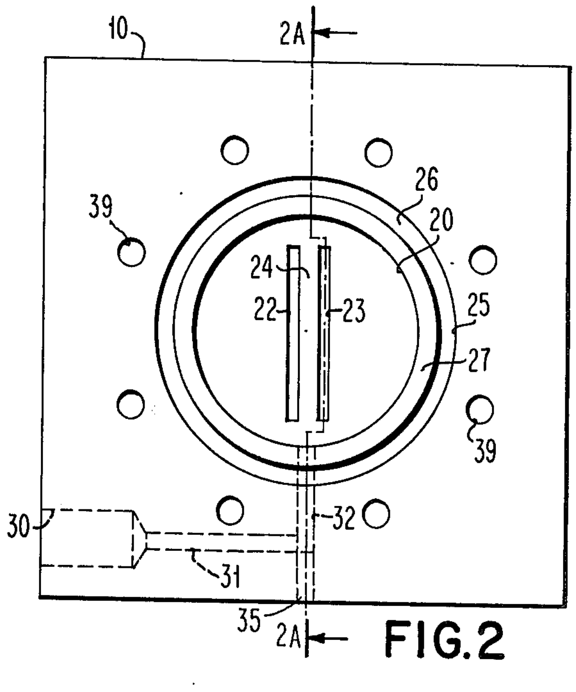
FIG. 2 is a rear view of the cavity plate of FIG. 1.
Figure 2A:
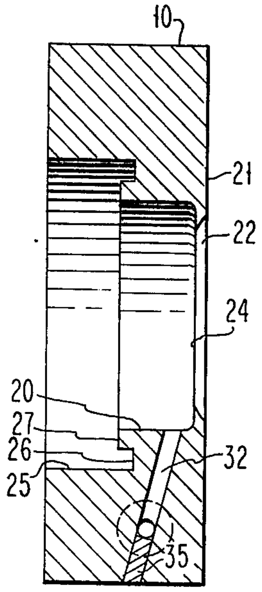
FIG. 2A is a sectional view of the cavity plate of FIG. 2.

Referring to FIGS. 1, 2 and 2A, the cavity plate 10 includes a cavity 20 cut to within a small distance from the face 21 of the plate forming thin wall member 24. Two parallel slots 22 and 23 are cut through the thin member 24 of the plate into the cavity 20. A second, larger cavity 25 is cut to form a space for the piezoelectric crystal driver 12. A notch 26 is cut below the face 27 of the second cavity 25 to form a space for the O-ring 12 to form a seal between the cavity plate 10 and the piezoelectric driver 13. A fluid inlet 30 is provided and connected via lines 31 and 32 to the cavity 20. Line 32 may be made by drilling through the cavity plate 10 and subsequently plugging the portion of the drilled hole extending beyond line 31 by means of plug 35. Lastly, cavity plate 10 is provided with a number of threaded holes 39 to allow the cavity plate to be bolted to mounting block 14.

FIG. 1 illustrates the nozzle plate 11 formed of a thin material and having two rows 40 and 41 of small nozzle orifices extending therethrough. The nozzle plate 11 may be formed in a number of different ways, for example having a planar single crystal material with an inorganic membrane such as taught by co-pending patent application Ser. No. 537,795, Chiou et al, entitled "Ink Jet Nozzle Structure and Method of Making," filed Dec. 31, 1974, and assigned in common with the present application. Another example is co-pending patent application Ser. No. 543,600, E. Bassous et al, entitled "Ink Jet Nozzles," filed Jan. 23, 1975, to form square orifices as taught by co-pending patent application Ser. No. 537,723, Weichardt, entitled "Ink Jet Nozzle," filed Dec. 31, 1974, both of which are assigned in common with the present application. The nozzle plate 11 is then cemented to the bottom of cavity 20 such that the rows 40 and 41 are each in alignment with the corresponding slot 22 and 23.

The words nozzle, orifice, and nozzle orifice all are similar in meaning, nozzle referring to a fluid outlet structure and orifice and nozzle orifice referring to the actual opening formed by the outlet structure.

Figure 3:
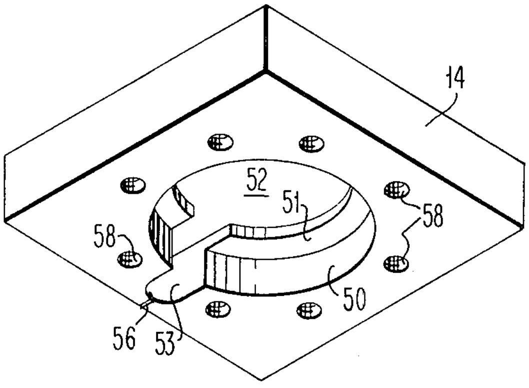
FIG. 3 is a perspective view of the mounting block of FIG. 1.
Figure 5:
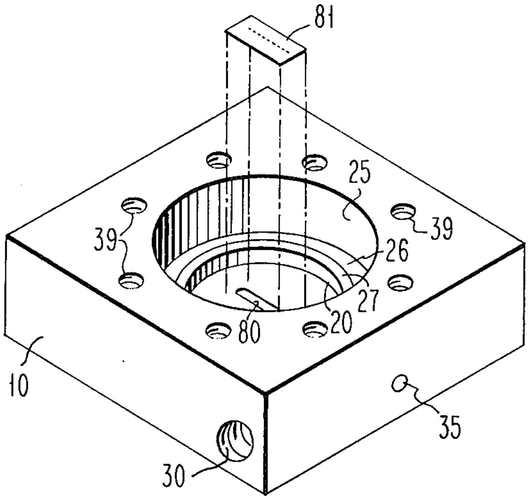
FIG. 5 is a perspective view of an alternative cavity plate and nozzle plate to those of FIG. 1.

Referring to FIGS. 1 and 3, mounting block 14 is formed with a large cavity 50 having a face 51 against which the rear of piezoelectric crystal driver 13 may firmly seal. A second smaller cavity 52 and slot 53 are provided to allow adequate clearance for wire 55 to be connected to the rear of the piezoelectric driver. A small slot 56 is supplied to allow the wire 55 to exit from the mounting block for connection to driver circuitry. Referring also to FIGS. 2 and 2A, when mounted within the assembly, piezoelectric driver 13 is thus clamped between surface 51 of backing plate 14 and O-ring 12 in notch 26 of cavity plate 10, and is maintained under slight compression. Cavity 20 is made of an electrically conductive material such that the cavity forms an electrical grounding surface contacting electrically conductive ink therein. The ink further contacts the face of the piezoelectric driver 13 so that the ink and cavity plate 10 form the grounding connection therefor. An electrical voltage applied to wire 55 thus creates a potential between the rear of driver 13 and the grounded facing thereof to thereby excite the piezoelectric driver. Lastly, mounting block 14 includes a number of countersunk holes 58 aligned with threaded holes 39 in cavity plate 10. These holes allow standard clamping screws 59 to be employed to clamp together with assembly of FIG. 1.

Figure 4:
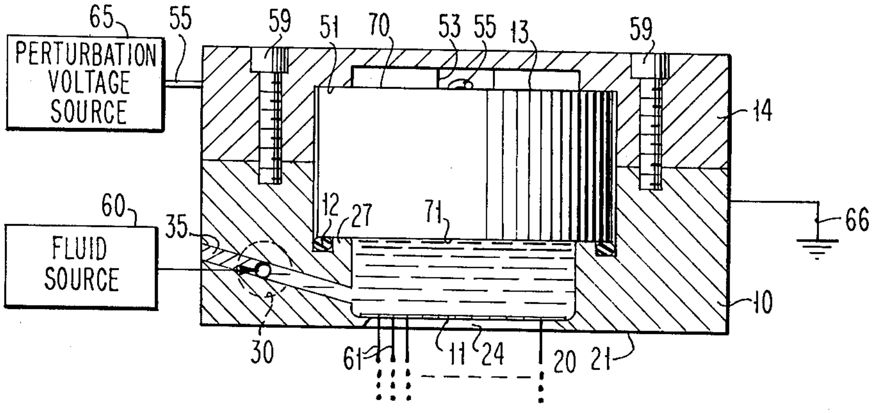
FIG. 4 is a schematic view of the assembled fluid jet head of FIG. 1 and fluid jet streams projecting therefrom.

FIG. 4 comprises an assembled schematic view of the elements of FIG. 1. A fluid source 60 is connected to input 30 of cavity plate 10 to thereby supply the fluid to cavity 20 under a desired pressure. The pressure is such that a plurality of fluid jets 61 emanate from the nozzles plate 11. A perturbation voltage source 65 is connected via wire 55 to piezoelectric crystal driver 13. The front of the piezoelectric driver 13 is in contact with the electrically conductive fluid in cavity 20 which further contacts the cavity surfaces of cavity plate 10, which plate is connected to ground 66. The perturbation voltage of source 65 may comprise, for example, a sine wave of 100 kilohertz frequency.

Application of the perturbation voltage from source 65 to the piezoelectric crystal driver causes the driver to tend to expand and contract between surface 70 and surface 71. The resultant vibration from the clamping of the piezoelectric driver between face 51 of mounting block and compressed O-ring 12 in notch 26 of cavity plate 10 is transmitted by the mounting block from face 51, via the screws 59 and cavity plate 10 to wall member 24 at the front of the cavity plate. Some vibration is also transmitted by compressed O-ring 12 via the cavity plate 10 to wall member 24. When vibrated in this manner, wall 24 tends to oscillate at the drive frequency of the perturbation voltage source 65 axially with respect to fluid streams 61. Nozzle plate 11 is cemented to wall 24 and similarly moves in an oscillating mode to thereby provide a velocity modulation of the fluid streams 61 in the axial direction. At the same time, the remainder of faces 70 and 71 of the piezoelectric driver remain unclamped so that the crystal may more freely expand and contract. Surface 71 of the driver is in contact with the pressurized fluid so as to form the rear wall of cavity 20. Expansion and contraction of the crystal results in surface 71 causing the contraction and expansion of the volume of the cavity 20, thereby inducing a pressure perturbation of the fluid within the cavity.

The vibration and pressure wave transmission rates are so high that within the small dimensions of the head, the velocity modulation of fluid streams 61 is in aiding phase to the pressure modulation of the fluid in cavity 20 as it exits from the orifices in nozzle plate 11. The combined modulation of the fluid thus results in a highly efficient use of the piezoelectric driver, such that in the assembly shown proper modulation occurs with a peak-to-peak voltage of perturbation source 65 of approximately 5.5 volts.

Exemplary dimensions of the apparatus of the preferred embodiment may be as follows: Selection of the piezoelectric driver depends upon the drop forming rate and the cavity size. A typical dimension could be a 1-inch circular piezoelectric disc with a one-half inch thickness which covers a three-fourths inch diameter cavity with a one-fourth inch depth. The front wall of the cavity plate could be 20 to 30 mils. The O-ring and notch may be arranged to allow a 2 to 3 mil compression of the O-ring. The orifices could be, for example, of .8 mils on 12 mil centers in rows spaced 80 mils apart.

Hybrid velocity and pressure modulation of fluid streams is not limited to the use of piezoelectric crystal drivers, but may also be utilized with other types of drivers, such as magnetostrictive drivers. The important aspect of the invention is that the driver be mounted so as to supply a vibration to the nozzle plate 11, for example, by transmission through solids such as mounting block 14, screws 59 and cavity plate 10, and also to supply a pressure modulation to the fluid such as by volumetric alteration of the pressurized fluid cavity 20.

While the invention has been particularly shown and described with reference to a preferred embodiment thereof, it will be understood by those skilled in the art that the foregoing and other changes in form and details may be made therein without departing from the spirit and scope of the invention.

I claim:

1. In a fluid jet head including a fluid input connected to a source of pressurized fluid, a plurality of nozzle orifices, a cavity communicating with said input and with said nozzle orifices to eject a stream of fluid from each said orifices, and a signal input connected to a perturbation signal source, the improvement comprising:

a perturbation means connected to said signal input and mounted to both vibrate said nozzle orifices in an axial direction and vary the volume of said cavity in response to said perturbation signal, for perturbating the velocity of each said fluid stream to cause each said ejected stream to break into a serial stream of drops;

said perturbation means comprising an electromechanical transducer for establishing a mechanical perturbation in response to said perturbation signal;

said perturbation means additionally forms a wall of said cavity vibrated by said mechanical perturbation to vary the volume of said cavity;

said nozzle orifices are located in another wall of said cavity and said wall is vibrated by said mechanically transmitted perturbation;

a cavity plate forming said cavity and said nozzle orifice locating wall of said cavity; and a mounting block for clamping said electromechanical transducer between said block and said cavity plate;

for mechanically transmitting said mechanical perturbation to said nozzle orifices.

2. The fluid jet head of claim 1 wherein:

said electromechanical transducer is a piezoelectric crystal driver.

3. In a fluid jet head including a fluid input connected to a source of pressurized fluid, at least one nozzle orifice, a cavity communicating with said input and with said at least one nozzle orifice to eject a stream of fluid from each said orifice, and a signal input connected to a perturbation signal source, the improvement comprising:

a perturbation means connected to said signal input and mounted to both vibrate said at least one nozzle orifice in an axial direction and vary the volume of said cavity in response to said perturbation signal, for perturbating the velocity of each said fluid stream to cause each said ejected stream to break into a serial stream of drops;

said perturbation means comprising an electromechanical transducer forming a wall of said cavity for establishing a mechanical perturbation in response to said perturbation signal to vary the volume of said cavity;

a cavity plate for mounting said nozzle orifice and forming another wall of said cavity; and a mounting block for clamping said electromechanical transducer between said block and said cavity plate for mechanically transmitting said mechanical perturbation to said nozzle orifices.

4. The fluid jet head of claim 3 wherein:

said electromechanical transducer is a piezoelectric crystal driver.

5. The fluid jet head of claim 3 additionally comprising:

means for mechanically transmitting said mechanical perturbation to said nozzle orifices.

6. The fluid jet head of claim 5 wherein said mechanical transmitting means contacts at least one surface of said electromechanical transducer.

* * * * *